US006310125B1

(12) United States Patent
Rayner

(10) Patent No.: US 6,310,125 B1
(45) Date of Patent: Oct. 30, 2001

(54) WATER-DISPERSED ADHESIVE COMPOSITIONS

(75) Inventor: Terry J. Rayner, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/543,185

(22) Filed: Apr. 5, 2000

(51) Int. Cl.$^7$ ................ C08J 5/10; C08K 5/29; C08L 75/00
(52) U.S. Cl. ............ 524/195; 524/175; 524/204; 524/217; 427/207.1; 427/388.4
(58) Field of Search .................. 524/195, 175, 524/204, 217; 427/207.1, 385.5, 388.4

(56) References Cited

U.S. PATENT DOCUMENTS

| | | |
|---|---|---|
| 4,130,528 | 12/1978 | Chen . |
| 4,250,070 | 2/1981 | Ley et al. . |
| 4,342,843 | 8/1982 | Perlinski et al. . |
| 4,424,642 * | 1/1984 | Stubler et al. ............... 43/114 |
| 4,463,110 | 7/1984 | Perlinski et al. . |
| 4,485,200 | 11/1984 | Perlinski et al. . |
| 4,820,863 | 4/1989 | Taylor . |
| 4,855,001 | 8/1989 | Damico et al. . |
| 4,931,494 | 6/1990 | Auchter et al. . |
| 5,008,363 | 4/1991 | Mallon et al. . |
| 5,047,588 | 9/1991 | Taylor . |
| 5,051,474 | 9/1991 | Warren et al. . |
| 5,081,173 | 1/1992 | Taylor . |
| 5,108,653 | 4/1992 | Taylor . |
| 5,176,777 | 1/1993 | Guilhem . |
| 5,543,455 | 8/1996 | Shah . |
| 5,574,083 | 11/1996 | Brown et al. . |
| 5,608,000 | 3/1997 | Duan et al. . |
| 5,610,232 | 3/1997 | Duan et al. . |
| 5,624,758 * | 4/1997 | Maksymkiw et al. ............ 428/423.1 |
| 5,652,288 * | 7/1997 | Wood et al. ............... 524/271 |
| 5,652,299 | 7/1997 | Nakajima et al. . |
| 5,703,158 | 12/1997 | Duan et al. . |
| 5,717,025 | 2/1998 | Maksymkiw et al. . |
| 5,721,302 | 2/1998 | Wood et al. . |
| 5,739,201 | 4/1998 | Ugai et al. . |
| 5,777,029 | 7/1998 | Horrion et al. . |
| 5,804,672 | 9/1998 | Bolte et al. . |
| 5,821,294 * | 10/1998 | Perlinski ............... 524/507 |
| 5,821,297 | 10/1998 | Arnold et al. . |
| 5,837,089 | 11/1998 | Magrum . |
| 5,840,823 | 11/1998 | Licht et al. . |
| 5,872,182 | 2/1999 | Duan et al. . |
| 5,905,113 | 5/1999 | Licht et al. . |
| 5,916,960 | 6/1999 | Lum et al. . |

FOREIGN PATENT DOCUMENTS

| | | |
|---|---|---|
| 2121959 | 10/1994 | (CA) . |
| 261085 | 1/1989 | (CS) . |
| 1 917 236 | 11/1970 | (DE) . |
| 39 17 306 | 12/1990 | (DE) . |
| 39 33 204 | 4/1991 | (DE) . |

(List continued on next page.)

OTHER PUBLICATIONS

Karagezyan et al., Kozh–Obuvn. Prom–st. (1997) (2), pp. 35–36 (Eng. Abs.).

Ogandzhanyan et al., Arm. Khim. Zh. (1977), 30(6), pp. 458–464 (Eng. Abs.).

Ordukhanyan et al., Arm. Khim. Zh. (1988), 41(3), pp. 142–146 (Eng. Abs.).

Boshnyakova et al., Plast. Massy (1976), (8), pp. 41–42 (Eng. Abs.).

Oganesyan et al, Prom. Sin. Kauch. Nauch.–Tekh. Sb. (1969), No. 7, pp. 9–12 (Eng. Abs. Only).

Karapetyan et al, Prom. Sin. Kauch., Nauch.–Tekh. Sb. (1969), No. 4, pp. 12–14 (Eng. Abs. Only).

Kleps et al., "Investigation of the Influence of Metal Oxides on the Thermal Degradation of Chlorine–Containing Polymers by Thermogravimetry," *Journal of Thermal Analysis*, vol. 32 (1987), pp. 1785–1789.

Kleps et al., "Investigation of the Influence of Zinc Oxide on Thermal Degradation of Olychloroprene," *Journal of Thermal Analysis*, vol. 36 (1990), pp. 1213–1221.

Abdel–Razik, "Photostabilizing Effect of 5–Hydroxy–3–Phenyl–amino–1–Phenyl–3:5–Dihyd robenzene Derivatives in Polychloroprene," *Journal of Polymer Science: Part A: Polymer Chemistry*, vol. 26, pp. 2359–2367 (1988).

Musch et al., "Polychloroprene Crosslinking for Improved Aging Resistance," *KGK Kautschuk Gummi Kunstoffe* 49, Jahngang, Nr. 5/96.

Al–Mehdawe et al., "Rubber–Bound Antioxidants. I. Amine Antioxidants Bound to Polychloroprene Rubber," *Rubber Chemistry and Technology*, vol. 62, pp. 13–32.

(List continued on next page.)

Primary Examiner—James J. Seidleck
Assistant Examiner—U. K. Rajguru
(74) Attorney, Agent, or Firm—Scott A. Bardell

(57) ABSTRACT

The invention provides water-dispersed adhesive compositions comprising a high modulus crystallizing polyester polyurethane, a polychloroprene, acrylic ester copolymer, a resin selected from the group consisting of thermosetting resins, thermoplastic resins, and a combinations thereof and a stabilizer system. The invention also provides adhesive made from the above adhesive compositions.

19 Claims, No Drawings

FOREIGN PATENT DOCUMENTS

| | | |
|---|---|---|
| 197 27 029 | 1/1999 | (DE) . |
| 0 451 998 | 10/1991 | (EP) . |
| 2 124 239 | 2/1984 | (GB) . |
| 50-3444 | 1/1975 | (JP) . |
| 50-3446 | 1/1975 | (JP) . |
| 50-22044 | 3/1975 | (JP) . |
| 58-21470 | 2/1983 | (JP) . |
| 60-36543 | 2/1985 | (JP) . |
| 60-255875 | 12/1985 | (JP) . |
| 61-283541 | 12/1986 | (JP) . |
| 1-129083 | 5/1989 | (JP) . |
| 2-20585 | 1/1990 | (JP) . |
| 2-127491 | 5/1990 | (JP) . |
| 4-164986 | 6/1992 | (JP) . |
| 4-323292 | 11/1992 | (JP) . |
| 8-199149 | 8/1996 | (JP) . |
| 8-302315 | 11/1996 | (JP) . |
| 10-195406 | 7/1998 | (JP) . |
| 10-273587 | 10/1998 | (JP) . |
| 11130913 | 5/1999 | (JP) . |
| 11-151794 | 6/1999 | (JP) . |
| 278 615 | 11/1997 | (SK) . |
| 480259 | 6/1978 | (SU) . |
| 852907 | 8/1981 | (SU) . |
| WO 92/02568 | 2/1992 | (WO) . |
| WO 94/13703 * | 6/1994 | (WO) . |
| WO 95/19403 | 7/1995 | (WO) . |
| WO 97/19121 | 5/1997 | (WO) . |
| Wo 97/32805 | 9/1997 | (WO) . |
| WO 98/33602 | 8/1998 | (WO) . |
| WO 99/14278 | 3/1999 | (WO) . |
| WO 99/14279 | 3/1999 | (WO) . |
| WO 99/26993 | 6/1999 | (WO) . |
| WO 99/48997 | 9/1999 | (WO) . |

OTHER PUBLICATIONS

Al–Mehdawe et al., "Rubber Bound Antioxidants. II. Amine Antioxidants Bound with Polychloroprene Rubber," *J. Patrol. Res.*, vol. 7, No. 2 (1988), pp. 99–110.

Amano et al., "Studies on the Stabilization of Chloroprene Rubbers Part I Thermal Dehydrochlorination Studies by the pH Method," *UDC*, 678, 763:66, 081, pp. 45–50.

Gardner et al., "The Thermal Degradation of Polychloroprene–I / Thermal Analysis Studies of the Stability of Polychloroprene Samples, and Measurements of the Kinetics of Degradation," *European Polymer Journal*, 1971, vol. 7, pp. 569–591.

Juhasz et al., "Thermal study of chlorine–containing polymers. I. Direct determination of the 1,2–units of polychloroprenes by thermal dehydrochlorination," Muanyag es Gumi (1968), 5(10), pp. 381–385 (Eng. Abs.).

Technical Data Sheet: "Primary Amino Alcohols", TDS 10, (1998), ANGUS Chemical Company, Buffalo Grove, IL.

Technical Data Sheet: "AquaStik™ 1120", (1/97) 248348A, DuPont Dow Elastomers, Wilmington, DE.

Technical Data Sheet: "AquaStik™ Selection Guide", (7/96) 248347A, DuPont Dow Elastomers, Wilmington DE.

Technical Data Sheet: "AquaStik™ 2540", DuPont Dow Elastomers, Wilmington, DE.

"What is AQR–0033?" (Aug. 14, 1998), DuPont Dow Elastomers, Wilmington, DE (pp. 4–12).

Technical Information: "Adhesive Raw Materials— Acronal® A 310 S", (1996) BASF Corporation, Charlotte, NC.

Technical Data Sheets: BASF Introduces: Luphen Polyester Urethane D DS 3507 For Technical Dry Bonding Applications, *Luphen D DS 3507*, BASF Charlotte Technical Center, Charlotte, NC, Presented Feb. 1999.

Technical Brochure: "Dispercoll for the manufacture of adhesives", Bayer, pp. 1–17.

Technical Data Sheets: "DRT—resin dispersions for water-based adhesives", Les Dérivés Résiniques & Terpéniques S.A.

Technical Data Sheet: "Dermulsene DT 50" (May 10, 1998), Les Dérivés Résiniques & Terpéniques S.A.

Technical Data Sheets: Dermulsene® in water based contact adhesives for "foam bonding" applications, (Apr. 1999), Les Dérivés Résiniques & Terpéniques S.A.

Technical Data Sheets: "Hercules Chemical Specialties Product Data, Piccotex® LC–55WK Anionic, Pure Monomer Resin Dispersion", (Jul. 24, 1996), Hercules Incorporation, Wilmington, DE.

Technical Brochure: Tacolyn 5001 Resin Dispersion (Res A–2496), Hercules Chemical Specialties.

Technical Data Sheet: "Polyurethane Dispersions, Quilastic", Issue 05, (01/99), Merquinsa, Barcelona, Spain.

Technical Data Sheet: "Quilastic DEP–170 Provisional Data Sheet", Issue 03, (01/99), Merquinsa, Barcelona, Spain.

Technical Data Sheets: Quilastic DEP–172 Provisional Data Sheet, Issue 04, (01/99), Merquinsa, Barcelona, Spain.

Technical Brochure: Neoprene polychloroprene, "Basic Compounding of Neoprene Latex", NL–310.1, ADH–220.2, (9/96) 300609A,DuPont Dow Elastomers, Wilmington, DE.

Technical Brochure: "Urethane Additives Package", Rhein Chemie Corporation.

Technical Data Sheet: "HRJ–12573", UT01750 (6/99), Schenectady International Inc., Schenectady, NY.

Technical Data Sheet: HRJ–13130, UMO1630R1 (2/95), Schenectady International Inc., Schenectady, NY.

Technical Data Sheet: "Durite AL 3029C", TDS AL, 3029C, (02/99), Borden Chemical—Canada.

Technical Data Sheet: "Durite AL 8405C", TDS AL, 8405C, (10/93), Borden Chemical—Canada.

* cited by examiner

WATER-DISPERSED ADHESIVE COMPOSITIONS

FIELD OF THE INVENTION

This invention relates to adhesives and adhesive compositions, particularly to water-dispersed adhesives and adhesive compositions.

BACKGROUND OF THE INVENTION

A typical use of adhesives is for assembling articles made from different individual component parts. For example, an article may be composed of a core material that is sandwiched between a rigid outer material. The most common core materials are those that are porous and lightweight. Examples of such core materials include polystyrene and polyurethane foams and papers and metals in the form of a honeycomb mesh. Common rigid outer materials include metals such as cold rolled steel, galvanized steel, phosphate treated steel, stainless steel, and aluminum.

In a typical manufacturing process, an adhesive is applied to one or both surfaces of a core material and a rigid outer material and then pressed together under pressure. In addition, the bonded assembly may be required to meet certain performance tests. For example, the bonded assembly may be required to provide a substantial green tensile strength and a final tensile strength that is even higher.

In order to attempt to meet these requirements, adhesive formulators have provided water-based contact adhesives. In general, water-based contact adhesives are easy to use and are typically inexpensive. For example, water-based contact adhesives can be applied to substrates by spraying or roll coating. However, both surfaces of the substrates to be bonded must be coated to form an adhesive bond which limits production flexibility. Additionally, the surfaces must be joined in a relatively short period of time in order to form a bond. Moreover, once the parts have been joined together, the parts cannot easily be repositioned. Further, the coating of both substrates to be bonded, the types of substrates to be bonded, and the method of application of the contact adhesive can result in waste of adhesive. Finally, currently available water-based contact adhesives have not demonstrated adequate bond strength and temperature resistance for some applications.

Formulators have also provided water-based adhesives containing polyurethane dispersions. These adhesive compositions are typically applied to a substrate to be bonded, dried, and then bonded using heat and pressure. Such dispersions that contain dispersed polyurethanes that are primarily amorphous only possess one glass transition temperature (Tg) generally below 0° C. Such adhesives are not generally suitable for forming a thermal bond as their storage modulus (G') over a measured temperature range tends to be relatively flat, necessitating higher temperatures to form a bond. Water dispersed adhesives containing carboxylated and sulfonated crystallizing polyester urethanes are known. Adhesives containing primarily crystallizing polyester urethanes may be relatively stiff or inflexible and typically have short open times, have limitations on drying temperatures, and have inadequate adhesion to metallic surfaces. Typically, such adhesive compositions are combined with an isocyanate to increase their thermal resistance.

SUMMARY OF THE INVENTION

In one aspect, the invention provides a water dispersed adhesive composition that comprises high modulus crystallizing polyurethane, polychloroprene, acrylic ester copolymer, a resin selected from the group consisting of thermosetting resins, thermoplastic resins, and combinations thereof, and a stabilizer system that is selected from the group consisting of branched primary amino alcohols; a combination of branched primary amino alcohol and carbodiimide; a combination of carbodiimide and dihydroxy metal compound; a combination of branched primary amino alcohol and dihydroxy metal compound; a combination of branched primary amino alcohol, carbodiimide, and magnesium oxide; a combination of magnesium oxide and carbodiimide; a combination of magnesium oxide and branched primary amino alcohol; a combination of dihydroxy metal compound, magnesium oxide, and branched primary amino alcohol; a combination of dihydroxy metal compound, magnesium oxide, and carbodiimide; and a combination of dihydroxy metal compound and magnesium oxide.

In preferred embodiments, the water dispersed adhesive compositions provide adhesives having high heat resistance, that is, can be formulated to maintain an adhesive bond up to temperatures of about 150° C. Preferably, the adhesive compositions of the invention provide 180 degree peel bond strengths of at least 18 pounds force/lineal inch (pli) (3.2 kN/m) to phosphate coated steel, and at least 16 pli (2.8 kN/m) to galvanized steel.

The term "dispersion" encompasses any form of solid dispersed in a liquid medium including, for example, latexes, emulsions, colloidal suspensions, and the like. The term "water dispersed" means that the carrier is primarily water. However, incidental organic solvents, such as those present in additives and commercially available components, may be present. Thus, the adhesive compositions of the invention are at least substantially free of organic solvents. Preferably, however, "water-dispersed" refers to a 100% water carrier.

The adhesive compositions of the invention do not contain zinc oxide and are free from external plasticizers. The term "plasticizers" as used herein means compounds from the following classes: phthalates including alkyl benzyl phthalates; adipates including dialkyl adipates; phosphates including alkyl aryl phosphates and triaryl phosphates; alkyl and aryl sulfonamides; and hydrogenated terphenyls.

Other advantages of the adhesives formed from the adhesive compositions of the invention are that the adhesives bond to metals, may be roll coated, provides high green strength durable bonds, and can be formulated to maintain an adhesive bond, with heat resistance, up to temperatures of about 150° C.

The water-dispersed adhesive compositions of the invention can be easily applied to a substrate without the odor and handling issues of organic-solvent based adhesives and then dried to form a non-tacky or non-blocking adhesive (at 23° C.) that may be activated at a later time (up to about 24 hours) to form a strong, heat resistant bond.

DETAILED DESCRIPTION OF THE PREFERRED EMBODIMENTS

Polychloroprene is present in the adhesives compositions at a level of from about 20 to about 285 parts per 100 parts high modulus crystallizing polyester polyurethane (as defined below), on a dry weight basis, hereinafter "phr polyurethane." Preferably, polychloroprene is present in the adhesive compositions of the invention at a level of from about 20 to about 100 phr polyurethane, and more preferably from about 40 to about 70 phr polyurethane.

Acrylic ester copolymer is present in the adhesive compositions of the invention at a level of from about 1 to about 200 phr polyurethane, preferably from about 1 to about 50 phr polyurethane, and more preferably from about 2 to about 10 phr polyurethane.

If present, thermosetting resin may be present in the adhesive compositions of the invention at a level of from 1 to about 35 phr polyurethane, preferably from about 2 to about 15 phr polyurethane, and more preferably from about 5 to about 10 phr polyurethane.

If present, thermoplastic resin may be present in the adhesive compositions of the invention at a level of from about 5 to about 50 phr polyurethane, preferably from about 10 to about 40 phr polyurethane, and more preferably from about 20 to about 30 phr polyurethane.

If present, branched primary amino alcohol may be present in the adhesive compositions of the invention at a level of from about 0.5 to about 5, preferably about 2 to about 4, and more preferably about 2.5 to about 3.5 phr polyurethane.

If present, carbodiimide may be present in the adhesive compositions of the invention at a level of from about 0.5 to about 5, preferably about 2 to about 4, and more preferably about 2.5 to about 3.5 phr polyurethane. The ratio of branched primary amino alcohol to carbodiimide can range from 3:1 to 1:3 by weight. A preferred branched primary amino alcohol to carbodiimide ratio is 1 to 1 by weight.

If present, dihydroxy metal compound (defined below) may be present in the adhesive compositions of the invention at a level of from about 0.5 to about 5, preferably about 2 to about 4, and more preferably about 2.5 to about 3.5 phr polyurethane. The ratio of branched primary amino alcohol to dihydroxy metal compound can range from 3:1 to 1:3 by weight. A preferred branched primary amino alcohol to dihydroxy metal compound ratio is 1 to 1 by weight.

If present, magnesium oxide, in water-dispersed form, may be present in the adhesive compositions of the invention at a level of from about 1 to about 5, and preferably from about 1.7 to about 2.3 phr polyurethane, dry weight magnesium oxide basis. A preferred branched primary amino alcohol to carbodiimide to magnesium oxide weight ratio is from 0.5:1:1 to 1:1:1 with a range from 0.5:1:1 to 2.5:1:1 being useful. Typically, some of the magnesium oxide hydrolyzes to the hydroxide in the presence of water.

If present, rheology modifiers are present in the adhesive compositions of the invention at a level of from about 0.3 to about 3.2, preferably about 0.7 to about 2.5, and more preferably from about 1.4 to about 2.1 phr polyurethane.

If present, pigment may be present in the adhesive compositions of the invention at a level of from about 1 to about 3, and preferably from about 0.5 to about 1.5 phr polyurethane.

The water-dispersed adhesive compositions of the invention contain at least one high modulus crystallizing polyester polyurethane, preferably in the form of a dispersion. By "high modulus", it is meant that the polyester polyurethane has a storage modulus (G') of at least $8 \times 10^5$ dynes/cm$^2$ at 115° C., and preferably within the range of $1 \times 10^9$ to $8 \times 10^5$ dynes/cm$^2$ over a temperature range of 25° C. to 115° C. as measured by Dynamic Mechanical Analysis (DMA) at a frequency of 1 Hertz. The term "crystallizing polyester polyurethane" means a polyester polyurethane polymer that has at least one measurable Tg above 20° C. as by measured by DMA. The function of the high modulus crystallizing polyester polyurethane is to provide the adhesives with high initial tack, high green strength, high peel strength, and high heat resistance. The high modulus crystallizing polyester polyurethane can either be carboxylated or sulfonated. Preferably, the high modulus crystallizing polyester polyurethane is sulfonated. The water-based sulfonated polyurethane contains ionomers, in the soft and hard segments of the polymer. High modulus crystallizing polyester polyurethanes can be formulated through the appropriate choice of di-functional isocyanates, for example, isophorone diisocyanate (IPDI) and tri-functional isocyanates, for example, trimers of hexamethylene diisocyanate (HDI) such as Desmodur™ XP-7100, N100, N330, available from Bayer, Pittsburgh, Pa., as the hard block segments and using medium molecular weight crystallizing polyester polyols. High modulus crystallizing polyester polyurethanes can be generally made by methods described in PCT Publication WO 92/02568. Useful high modulus sulfonated crystallizing polyester urethanes include those sold under the trade designations Luphen® D 200, Luphen® DDS 3507 (G' $9 \times 10^8$@25° C.; ~$1 \times 10^7$@55° C.; $9 \times 10^6$@100° C. Luphen® DDS 3528 (BASF Corporation), and Dispercoll™ U-53 (G' $1 \times 10^9$@25° C.; ~$2 \times 10^7$@55° C.; ~$1-2 \times 10^7$@100° C.). The above storage modulus values are measured values using DMA at a frequency of 1 Hertz.

The water-dispersed adhesive compositions of the present invention include at least one polychloroprene. Polychloroprene, as used herein, refers to a homopolymer or copolymer of chloroprene (2-chloro-1,3-butadiene). Comonomers for use in copolymers include a wide variety of compounds such as styrene, vinyl toluene, 2,3-dichlorobutadiene, acrylic acid, methacrylic acid, and derivatives such as methacrylates, acrylates, and acrylonitriles.

Polychloroprene is readily available as an aqueous dispersion, such as a latex or emulsion. While a broad range of dispersions are suitable, useful commercially available dispersions generally have from about 30% to about 65%, more usually from about 40% to about 60%, preferably from 45% to 60% by weight solids content. The dispersions generally have a particle size in the range of from about 0.1 microns in diameter to about 0.4 microns in diameter, depending on the specific grade.

Polychloroprene is available in a wide variety of types, from low to high crystallinity, and from sol to medium or high gel. The preferred polychloroprenes are sol to medium gel and low to medium crystallinity.

Suitable polychloroprene dispersions include anionic polychloroprene dispersions available from DuPont Dow Elastomers under the tradenames: LATEX 750; LATEX 654; AQUASTIK grades 1120 (which is carboxylated), AQS2540, AQ 0033, and AQ 0035. A suitable sol polymer polychloroprene dispersion is available from DuPont Dow Elastomers under the name LATEX 735.

The water-dispersed adhesive compositions of the invention contain one or more acrylic ester copolymers. The acrylic ester copolymer acts as a compatibilizer for the high modulus polyester polyurethane and the polychloroprene. Commercially available acrylic ester copolymers useful in the water-dispersed adhesive compositions of the invention include Acronal® A 310 S (butyl acrylate/methyl methacrylate copolymer dispersion; Tg: −20° C.) and Acronal® A 311 S (butyl acrylate/methyl methacrylate copolymer dispersion; Tg: −20° C.), available from BASF Corporation. The above commercially available acrylic ester copolymers are believed to be derived from a copolymer of butyl acrylate and methyl methacrylate and crosslinked with a hydrazine derivative, for example, a dihydrazide, when the copolymer is dried. U.S. Pat. Nos. 4,250,070 and 4,931,494 describe the preparation of acrylates crosslinked using a dihydrazide.

The water-dispersed adhesive compositions of the invention contain a thermosetting resin, a thermoplastic resin, or a combination of both. Preferably, the thermosetting resin is in the form of a water solution, water dispersion, water suspension, or water/thermosetting resin paste. The thermosetting resin imparts enhanced heat resistance to the adhesives of the invention. Examples of thermosetting resins include phenolic resins based on, that is, having a monomer base made from butylphenol, phenol/cresol, butylphenol/bisphenol A, amylphenol/bisphenol A, bisphenol A, octylphenol, o-cresol-formaldehyde, bisphenol A-formaldehyde, phenol, urea-formaldehyde, and melamine-formaldehyde. Preferred thermosetting resins include phenol- and o-cresol-formaldehyde, urea-formaldehyde, melamine-formaldehyde, and bisphenol A-formaldehyde thermosetting resins. Useful thermosetting phenolic resins include those having the product codes HRJ-13130; SP-6877; and HRJ-12573, available from Schenectady International, Inc., Schenectady, N.Y.

The water-dispersed adhesive compositions of the invention may also include one or more thermoplastic resins. The thermoplastic resins may be added to the compositions to provide increased tack during bond formation and to further increase cohesive strength. Preferably, the thermoplastic resins are in the form of aqueous dispersions. Preferably, the softening point of the thermoplastic resin is 80° C. or above. Useful thermoplastic resins include rosin esters, acrylic resins, and pure monomer hydrocarbon resins. Useful rosin esters include modified rosin esters, hydrogenated rosin esters, esters of dimerized rosin, polymerized rosin esters, acid-modified rosin esters, dark rosin esters, and liquid rosin esters. The rosin source may be derived from any of wood rosin, tall oil rosin, or gum rosin. Typical descriptions of useful rosin esters include methyl ester of wood rosin, hydroabietyl alcohol of gum rosin, hydrogenated methyl ester of wood rosin, triethylene glycol (TEG) ester of partially hydrogenated wood rosin, glycerol ester of wood rosin, pentaerythritol (PE) ester of tall oil rosin or PE ester of tall oil rosin, glycerol ester of partially dimerized rosin, PE ester of partially hydrogenated wood rosin, glycerol ester of gum rosin, and PE ester of modified wood rosin. A preferred rosin ester is pentaerythritol ester. Preferred commercially available rosin esters include Tacolyn™ 1085 (Hercules, Inc.), a glycerol ester of tall oil rosin, and Aquatac™ 6085 (Arizona Chemical), a glycerol ester of tall oil rosin. A preferred thermoplastic acrylic resin is Neocryl™ A-7129 (Neoresins Division of Avecia Inc.), believed to be a copolymer of butylacrylate and acrylonitrile. Examples of pure monomer resins include those pure monomer resins manufactured as copolymers of modified styrenes, aromatic resins from pure monomer feeds, and hydrogenated pure aromatic resins from selective hydrogenation of base resins using styrenic based co-monomers. Preferred pure monomer hydrocarbon resin dispersions include alphamethyl styrene copolymers, such as Tacolyn™ 5001 (Hercules, Inc.), an alphamethyl styrene-styrene copolymer, and Piccotex™ LC55WK (Hercules, Inc.), an alphamethylstyrene-vinyl toluene copolymer.

The water-dispersed adhesive compositions of the invention also include an effective amount of a stabilizer system. An "effective" amount of a stabilizer system means an amount of stabilizer system to minimize drift in pH below a pH of about 7 to prevent coagulation of polychloroprene and to prevent hydrolysis of any ester moieties, for example, those in the high modulus crystallizing polyester polyurethane. Hydrolysis of ester moieties of the crystallizing polyester polyurethane will cause the adhesive performance of the adhesive to decline. Such hydrolysis may be detected by a major shift in pH of the adhesive composition and by using analytical techniques such as Fourier Transform Infrared Spectroscopy (FTIR), gas chromatography, and mass spectrometry. The stabilizer system protects polyester groups from hydrolysis and scavenges acids that may be released from the polychloroprene, that is, buffers the adhesive compositions and minimizes pH drift. This is important because polychloroprene provides two sources of chlorine, one is labile and one is bound. Over time the labile chlorine can become available to form hydrochloric acid which results in a corresponding decrease in pH of the adhesive composition. As the pH continues to drop, the particle size of the polychloroprene dispersion will increase due to coagulation and the hydrochloric acid can start to hydrolyze the available ester groups, split the ester functionality into an acid and an alcohol, which results in a softer, lower modulus polyurethane.

The stabilizer system comprises one or more branched primary amino alcohols; a combination of one or more branched primary amino alcohols and one or more carbodiimides; a combination of one or more carbodiimides and one or more dihydroxy metal compounds; a combination of one or more branched primary amino alcohols and one or more dihydroxy metal compounds; or a combination of one or more branched primary amino alcohols, one or more carbodiimides, and magnesium oxide. The stabilizer system may also further comprise an antioxidant.

The branched primary amino alcohols act primarily as an acid scavenger. The branched primary amino alcohols are derived from nitroparaffins by way of nitro alcohols. Useful branched primary amino alcohols are those which are miscible in water. Preferred primary amine alcohols include 2-amino-1-butanol; 2-amino-2-methyl-1,3-propanediol; 2-amino-2-methyl-1-propanol; 2-amino-2-ethyl-1,3-propanediol; and tris(hydroxymethyl)aminomethane.

A carbodiimide as used herein is a compound containing the functional group: —N=C=N—. The carbodiimides are useful for preventing hydrolysis of functional groups such as ester groups. The carbodiimides may be aliphatic or aromatic. Useful carbodiimides are either miscible or dispersible in water. Preferred commercially available carbodiimides include Stabaxol® P 200 (reaction product of tetramethylxylene diisocyanate; water-dispersed), Stabaxol® P (poly(nitrilomethanetetraylnitrilo (2,4,6-tris(1-methylethyl)-1,3-phenylene)), and Stabaxol® I (tetraisopropyldiphenylcarbodiimide) (RheinChemic) and Ucarlnk® XL-29SE (Union Carbide, Danbury, Conn.). Both Stabaxol® P and I are useful in the compositions of the invention if first dispersed in water. Preferred carbodiimides are those that are sterically hindered, water miscible, and contain little or no organic solvent.

The dihydroxy metal compounds are useful as acid scavengers. Useful dihydroxy metal compounds are those compounds having fully substituted trivalent metal ion wherein two of the valences are filled with hydroxyl groups and the third valence is filled with a moiety other than hydroxyl. The dihydroxy metal compounds are dispersible in water. Preferred dihydroxy metal compounds include dihydroxyaluminum aminoacetate and dihydroxyaluminum sodium carbonate.

Preferably, the magnesium oxide is in the form of a water dispersion. It should be understood however that a certain amount of magnesium oxide converts to magnesium hydroxide in the presence of water. Preferred "magnesium oxide" dispersions are made from commercially available magnesium oxide such as Elastomag™ 170 (Morton Thiokol) and Maglite™ A (C. P. Hall). Magnesium oxides may be dispersed by those skilled in the art or obtained from vendors such as Harwick Chemical, Tiarco Chemical, and H. M. Royal.

The compositions of the invention may optionally, but preferably, contain one or more antioxidants. Useful antioxidants include Octolite™ 640, a 55% solids by weight emulsion blend 50:50 by weight of a polymeric hindered phenol and a thioester; Octolite™ 561, a 50% solids by weight dispersion of 4,4'-butylidene-bis(6-t-butyl-m-cresol); Octolite™ 544, a 55% solids by weight dispersion of N,N'-di-beta-napthyl-p-phenylenediamine; Octolite™ 504, a 50% solids by weight dispersion of 2,2'-methylenebis (6-t-butyl-p-cresol); Octolite™ 485 a 46% by weight solids dispersion of bisphenol antioxidant, an anionic emulsion of Uniroyal's Naugawhite Liquid; Octolite™ 424, a 63% solids by weight emulsion blend 50:50 by weight of a polymeric hindered phenol and di-tridecylthiodipropionate (DTDTDP) thioester; Octolite™ AO-50, a 50% solids by weight emulsion of a hindered phenol and DTDTDP thioester; Octolite™ AO-28, a 63% solids by weight emulsion blend 80:20 of a polymeric hindered phenol and DTDTDP thioether; and Octolite™ WL, a 50% solids by weight emulsion of butylated reaction product of para-cresol and dicyclopentadiene, all available from Tiarco Chemical Division, Textile Rubber and Chemical Company, Inc., Dalton, Ga.

The thermal resistance of the adhesives of the invention may be further increased by adding one or more water-dispersed or water dispersible isocyanates to the adhesive compositions of the invention. As used herein "isocyanates" include both blocked and un-blocked isocyanates. Generally, if present, isocyanates may be present in the adhesive compositions at levels of about 1 to about 7.5% by weight of the water-dispersed composition, with a level of from 3 to 5% by weight of the composition being preferred.

Thermal resistance of the adhesives of the invention may also be enhanced by adding low viscosity epoxy solutions such as Araldite™ 6010 (Ciba Resins, Brewster, N.Y.) and dispersions thereof including Epi-Rez™ 351 0-WO-60 (Shell Chemical Company, Houston, Tex.), an epichlorohydrin-bisphenol A epoxy resin, or modified bisphenol A dispersions including Epi-Rez™ 3519-W-50, Epi-Rez™ 6006-W-70, and Epi-Rez™ 5003-W-55, all available from Shell Chemical Company.

The water-dispersed adhesive compositions of the invention may also include one or more rheology modifiers to control the flow of the adhesive composition. Rheology modifiers are added to the adhesive compositions to preferably provide adhesive compositions having near Newtonian flow characteristics. An effective amount of a rheology modifier is that amount which provides an adhesive composition of the invention with near Newtonian flow characteristics. Useful rheology modifiers include alkali soluble or swellable emulsions such as Acrysol™ ASE-60, ASE-75, and ASE-95NP, Acusol™ 810A (Rohm and Haas, Philadelphia, Pa.) and Alcogum™ L-15, L-131, and L-37 (Alco Chemical, Chattanooga, Tenn.), alkali soluble associative emulsions such as Alcogum™ SL-70, and 78 (Alco Chemical) or Acrysol™ TT-935 or RM-5 (Rohm and Haas), and alkali swellable associative urethanes such as Polyphobe™ P-104, and P-106 (Union Carbide, Cary, N.C.) and in addition, hydrophobically-modified associative polyurethane dispersions such as NopCo™ DSX 1514 and 1550, (Henkel Corporation, Ambler, Pa.) and Acrysol™ RM-825, RM 1020, RM 8W (Rohm and Haas). The preferred rheology modifiers are hydrophobically-modified associative polyurethane dispersions.

Pigments may be added to color the adhesive compositions. Suitable pigments are available as powders, which are water dispersible, or as aqueous dispersions. Some suitable pigments include Phthalocyanine Green and Blue aqueous dispersion (Hilton Davis Chemical Co., Cincinnati, Ohio), Akrosperse™ Calcium 2B red aqueous dispersion (Akrochem Corporation, Akron, Ohio), and Carbon Black™ aqueous dispersion (Technical Industries Inc., Peace Dale, R.I.), and combinations thereof.

The adhesive compositions of the invention may also contain other conventional additives such as adhesion promoters. A preferred silane adhesion promoter is Silquest™ Coatosil™ 1770 (beta-(3,4-epoxycyclohexyl)ethyltriethoxysilane) or Silquest™ Y-15078 (gamma-glycidoxypropylmethyldiethoxysilane) both available from CK Witco Corporation, Tarrytown, N.Y.

The adhesive compositions can be made by combining the ingredients with mixing at room temperature as is well known by one skilled in the art. Normally, low shear mixing equipment can be used.

The adhesive compositions of the invention can be applied to one or both surfaces of the substrates to be bonded. The adhesive compositions may be applied by conventional means, such as brush, roll coating, spraying, etc. The adhesive compositions of the invention may also be applied to release liners and dried to form self-supporting films and then die cut to the desired shape. The adhesive compositions of the invention may be dried at room temperature or elevated temperatures. Examples of substrates that can be bonded include metals such as cold rolled steel, phosphate treated steel, galvanized steel, and aluminum; woods; plastics including vinyls; rubbers such as styrene-butadiene rubber, neoprene, nitrites, and polyurethanes; fabrics; and foams, such as expanded polystyrene, polyurethanes, and the like.

The adhesive compositions of the invention when dried can also be used as a vibration damping material alone or in conjunction with a backing layer as a constrained layer construction. For example, the adhesive compositions of the invention may be cast as a film, placed into position, and heated to form a bond. Alternatively, the adhesive compositions of the invention may be coated onto a surface and then dried to form a damping material. Specific uses may include those found in automobiles, computers, transformers, aircraft, and the like. Useful damping materials of the invention have a Tan delta value of greater than 0.3 and a G' value of equal to or greater than $10^6$ dynes/cm$^2$. More specific information about useful damping material characteristics may be found in Sound and Vibration Damping with Polymers, Robert Corsaro and L. H. Sperling (1990). Adhesives of the invention are useful as vibration damping materials over the range of about 50 to about 125° C.

Index of Abbreviations

| Abbreviation | Tradename | Description |
|---|---|---|
| Polychloroprene | | |
| AQS1120 | AquaStik ™ 1120 | Nonionic surfactant-stabilized carboxylated polychloroprene dispersion, available from DuPont Dow Elastomers Llc, Wilmington, DE |
| Polyester Polyurethane | | |
| DDS3507 | Luphen ™ DDS 3507 | Sulfonated polyester polyurethane dispersion, measured storage modulus (G') = $9 \times 10^8$ @ 25° C.; ~$1 \times 10^7$ @ 55° C.; $9 \times 10^6$ @ 100° C., available from BASF Corporation, Charlotte, NC |
| U53 | Dispercoll ™ U-53 | Sulfonated polyester polyurethane dispersion, measured storage modulus (G') = $1 \times 9^8$ @ 25° C.; ~$2 \times 10^7$ @ 55° C.; ~$1 - 2 \times 10^7$ @ 100° C., available from Bayer Corporation, Pittsburgh, PA |
| Acrylic Ester Copolymer | | |
| A310S | Acronal ™ A 310S | Butyl Acrylate/Methylmethacrylate copolymer dispersion with hydrazide functionality, Tg −20° C., available from BASF Corporation, Charlotte, NC |
| Thermosetting resin | | |
| HRJ13130 | HRJ-13130 | Phenolic resin dispersion, available from Schenectady International, Inc., Schenectady, NY |
| Stabilizer | | |
| P200 | Stabaxol ™ P 200 | Water-dispersible aromatic carbodimnide (reaction product of tetramethylxylene diisocyanate), available from RheinChemie, Trenton, NJ |
| Trisamino | Tris(hydroxymethyl) aminomethane | Neat, available from Angus Chemical Company, Buffalo Grove, IL |
| Thermoplastic Resin | | |
| T5001 | Tacolyn ™ 5001 | α-Methylstyrene-styrene resin, available from Hercules, Wilmington, DE |
| T1065 | Tacolyn ™ 1065 | Mixed aromatic/aliphatic hydrocarbon resin, available from Hercules, Wilmington, DE |
| T1085 | Tacolyn ™ 1085 | Glycerol ester of tall oil rosin, available from Hercules, Wilmington, DE |
| LCS5WK | Piccotex ™ LC 55WK | α-Methylstyrene-vinyltoluene resin, available from Hercules, Wilmington, DE |
| A7129 | Neocryl ™ A-7129 | Butylacrylatelacrylonitrile dispersion, available from Neoresins Division of Avecia Inc, Wilmington, DE |
| AQ6085 | Aquatac ™ 6085 | Glycerol ester of tall oil rosin dispersion, available from Arizona Chemical, Panama City, FL |
| AL3029C | Durite ™ AL-3029C | Urea-formaldehyde solution, available from Borden Chemicai Canada, West Hill, Ontario, Canada |
| AL8405C | Durite ™ AL-8405C | Urea-formaldehyde solution, available from Borden Chemical Canada, West Hill, Ontario, Canada |
| Miscellaneous Additives | | |
| F111 | Foamaster 111 | 100% non-silicone antifoam dispersion, available from Henkel Corp., LaGrange, IL |
| O1 640 | Octolite ™ 640 | Antioxidant which is an emulsion blend of 50:50 by wt. polymeric hindered phenol and thioester, available from Tiarco Chemical Division, Dalton, GA |
| RM1020 | Acrysol ™ RM-1020 | Rheology modifier, hydrophobically modified ethylene oxide urethane emulsion, available from Rohm and Haas Company, Philadelphia, PA |
| ASE75 | Acrysol ™ ASE-75 | Rheology modifier, acrylic emulsion containing carboxylic acid functional groups, available from Rohm and Haas Company, Philadelphia, PA |
| Col770 | Coatosil 1770 | Beta-(3,4-epoxycyclohexyl)ethyltriethoxysilane, availabie from CK Witco Corp, Tarrytown, NY |
| W78 | Wetlink 78 | Organosilane ester available from OSI Specialties, Subsidiary of CK Witco Corp, Tarrytown, NY |
| ADH | Adipic acid dihydrazide | Available from Japan Hydrazine Company, Tokyo, Japan |
| NH4Cl | Ammonium Chloride | Neat, available from Aldrich Chemical, Milwaukee, WI |
| MgO | Maglite ™ A | Magnesium oxide dispersion, available from Tiarco Chemical Division of Textile Rubber and Chemical Company, Dalton, GA |
| B17986 | Trixene ™ BI 7986 | Water-dispersible blocked polyisocyanate, available from Baxenden Chemicals, Baxenden, England |
| A6010 | Araldite ™ GY 6010 | bisphenol A/epichlorohydrin liquid epoxy resin, available from Ciba Resins, Brewster, NY |

EXAMPLES

The invention will be further illustrated by the following examples, which are illustrative of specific modes of practicing the invention, and are not intended as limiting the scope of the appended claims.

Unless otherwise stated, all percentages are percentages by dry weight and those percentages applying to adhesive compositions are by dry weight of the total amount of adhesive component.

Parts per hundred (phr), unless otherwise stated, are also parts per 100 parts of the dry weight of the sulfonated polyurethane component.

Dashes in the tables indicate that no value was noted or that an ingredient was not present.

Unless otherwise stated, all components were added in the form of dispersions (i.e., in water).

TEST PROCEDURES

Room Temperature T-Peel Strength, Twill to Twill

In this test, the adhesive strength of a composition is determined for bonded parts of cotton twill to itself.

Two pieces of cotton twill (available from Rosetrim of Toronto, Ontario, Canada) one inch (2.54 cm) wide and approximately 9 inches (22.86 cm) long are each coated with two thin layers of the composition being tested with at least 20 minutes dry time between coats using a one inch (2.54 cm) wide paint brush. One inch at each end of each piece was left un-coated. After 20 minutes at room temperature, followed by 194° F. (90° C.) for 15 minutes, the two pieces are immediately mated, coated side to coated side, using a 165 g hand rubber roller.

The bonded part is left at ambient temperature for 72 hours, then conditioned 73 F. (23° C.) for 1 hour prior to testing. The free ends are clamped in the jaws of an INSTRON tensile testing machine and the bonded part is tested at a separation rate of 2 inches (50 mm) per minute.

The force required to peel the two pieces of twill apart is measured as an average force recorded over the bonded area tested. The force is recorded in Newtons per inch width and converted to pounds per inch width (piw) and kilonewtons per meter (kN/m). The fabric was peeled back over a distance of 4.25 inches (10.8 cm) wherein the force for the first 0.5 inch (1.27 cm) and the last 0.25 inch (0.64 cm) was excluded from the average force calculation. The reported value in the Tables is the average of three replicates for each composition tested.

Room Temperature 180° Peel Strength, Substrate to Twill

In this test, the effectiveness of bonding of a composition is compared for various substrates bonded to cotton twill.

The twill utilized was a one inch (2.54 cm) wide cotton twill (available from Rosetrim of Toronto, Ontario, Canada). One surface of the twill was brush coated with the composition being tested and dried in air at room temperature for 20 minutes. A second coating of the test composition was brushed over the first and the coated twill was first dried in air at room temperature for 20 minutes then at 194° F. (90° C.) for various times (either 20 minutes or 30 minutes). The coated twill was removed from the oven and further conditioned at room temperature for various times, i.e., open time, (30 minutes, 1 hour, 2 hours, 4 hours, 6 hours, or 22 hours). A portion of the twill was left uncoated for attachment within a tensile testing machine.

The metal substrate was heated to 194° F. (90° C.) and the plastic substrate to 176° F. (80° C.) then the coated twill was applied to the substrate, with the composition coated side contacting the substrate, and immediately rolled down with a 165 gram rubber hand roller to form a test sample. The test substrates were 1.5 inches by 12 inches by ⅛ inch (3.8 cm wide by 30.5 cm long by 0.32 cm thick) acrylonitrile-butadiene-styrene (ABS), available from Cadillac Plastics, London, Ontario, Canada, 1.5 inches by 12 inches by 0.045 inch (3.8 cm wide by 30.5 cm long by 0.011 cm thick) phosphate coated cold rolled steel (CRS), available from Advanced Coating Technologies, Hillsdale, Mich., and 1.5 inches by 12 inches by 0.045 inch (3.8 cm wide by 30.5 cm long by 0.011 cm thick) galvanized steel (Gal. Steel), available from Advanced Coating Technologies, Hillsdale, Mich.

The test sample was conditioned at room temperature for 72 hours and then clamped into the jaws of an INSTRON Model 4400R tensile testing machine, using Series IX software, and tested at a crosshead speed of 2 inches (50 mm) per minute. The force required to peel back the fabric (in a direction 180° to the bond line) was recorded in pounds per inch width (piw) and converted to kiloNewtons per meter (kN/m). The fabric was peeled back over a distance of 4.25 inches (10.8 cm) wherein the force for the first 0.5 inch (1.27 cm) and the last 0.25 inch (0.64 cm) was excluded from the average force calculation. The reported value in the Tables is the average of two replicates for each composition tested.

Elevated Temperature Aged 180° Peel Strength, Substrate to Twill

In this test, the effectiveness of bonding of a composition is compared for various substrates bonded to cotton twill after exposure to an elevated temperature of 261° F. (127° C.).

The steel/twill test samples used for determining "Room Temperature 180° Peel, Substrate to Twill" above, were utilized for determining peel force after exposure to elevated temperature of 261° F. (127° C.).

The test samples were put in an oven at 261° F. (127° C.) for 20 minutes. The samples were removed from the oven and conditioned at room temperature for 20 hours.

Each of the test samples were then clamped into the jaws of an INSTRON Model 4400R tensile testing machine, using Series IX software, and tested as described above. The force required to peel back the fabric (in a direction 180° to the bond line) was recorded in pounds per inch width (piw) and converted to kilonewtons per meter (kN/m). The fabric was peeled back over a distance of 4.25 inches (10.8 cm) wherein the force for the first 0.5 inch (1.27 cm) and the last 0.25 inch (0.64 cm) was excluded from the average force calculation. The reported value in the Tables is the average of two replicates for each composition tested.

Heat Resistance-Substrate to Twill

The test panels were prepared according to the procedure outlined in "Room Temperature 180° Peel Strength, Substrate to Twill" test method, conditioned at room temperature for a given period of time, then the bonded assembly is suspended from a wire rack by clips with the twill facing down. A mark is made on the twill to indicate the leading edge/start of the bonded area. A 1.1 lb (500 g) weight is hung from the loose end of the twill and the wire rack is placed into an air circulating oven. The initial temperature is set at 140° F. (60° C.) and the samples are exposed to this temperature for 30 minutes. After 30 minutes in the oven, the bond separation (that is, the distance the bond has released) is measured and a second mark is made on the sample to indicate this point as the start of the bonded area for the next test segment. The temperature of the oven is increased to 158° F. (70° C.), held constant for 30 minutes, and the bond separation is measured from the second mark. A third mark is made on the sample to indicate the start of the bonded area. The test is continued wherein the temperature of the oven is increased in 18° F. (10° C.) increments, holding the temperature constant for 30 minutes each increment, and the bond separation is measured.

Overlap Shear Strength

In this test, the effectiveness of bonding of an adhesive composition was determined for a bond tested in shear.

The composition to be tested was coated onto one substrate using two thin coats, dried 15 minutes (ambient temperature) between coating using a 1 inch (2.54 cm) wide brush. After coating, the substrate was allowed to dry 15 minutes at room temperature followed by 15 minutes at 194° F. (90° C.). Immediately after removing from the oven, the coated side of the substrate is mated to an uncoated substrate to provide an overlap bond area of 1 square inches (6.25 square centimeters) and the mated pieces are pressed together using a 0.36 lb (165 g) rubber roller.

The test substrates are 1 inch by 3 inches by 0.13 inch (2.54 cm wide by 8.5 cm long by 0.33 cm thick) oak, available from Hutton Custom Woodworking, London, Ontario, Canada, 1 inch by 3 inches by 0.13 inch (2.54 cm wide by 8.5 cm long by 0.33 cm thick) acrylonitrile-butadiene-styrene (ABS), available from Cadillac Plastics, 1 inch by 3 inches by 0.045 inch (2.54 cm wide by 8.5 cm long by 0.11 cm thick), phosphate coated cold rolled steel (CRS), available from Advanced Coating Technologies; and 1 inch by 3 inches by 0.045 inch (2.54 cm wide by 8.5 cm long by 0.11 cm thick) galvanized steel (Gal. Steel), available from Advanced Coating Technologies.

After mating, the samples are conditioned at room temperature for 72 hours, then at 73° F. (23° C.) for 1 hour. The samples are then tested on an INSTRON tensile tester at a crosshead speed of 0.2 inches (5 mm) per minute in shear until the bond fails. Data is recorded in Newtons per inch$^2$ (6.45 cm$^2$). The value reported is the average value of three samples and has been converted to pounds per square inch (psi) and megapascals (MPa).

Storage Modulus (G') by Dynamic Mechanical Analysis (DMA)

A film of adhesive composition or polymer was cast onto a 1 mil ( 0.025 mm) thick polyester release film. The cast adhesive or polymer film on the polyester release film was dried at room temperature for 20 hours, then placed in an air circulating oven at 194° F. (90° C.) for 30 minutes. After removal from the oven, the adhesive or polymer film with release film was conditioned at the test temperature 122° F. (50° C.) or 176° F. (80° C.) for a minimum of 30 minutes, removed from the oven, the release film removed, and the adhesive or polymer film was immediately tested using a Rheometrics brand DMA. Measurement was made at 1 Hertz (Hz) from initial to final value (constant value). Values were taken at various times (0, 2, 5, 10, 20, and 30 minutes). The percent increase in G' over the initial (i.e., 0 minutes) was calculated and reported. It is desirous that G' reaches its maximum value in the minimum time.

Example 1

An adhesive composition was prepared by combining in order: DDS3507, RM1020, A310S, T5001, HRJ13130, AQS1120, F111, O1640, Trisamino, P200, and ASE75. The amounts of the components used are shown in Table 1.

TABLE 1

| Component | Percent Solid Content (%) | Phr Based on 100 Parts By Weight DDS3507 |
|---|---|---|
| DDS3507 | 45.0 | 100 |
| AQS1120 | 48.1 | 59.2 |
| A310 | 55.0 | 3.76 |
| HRJ13130 | 43.3 | 8.14 |
| T5001 | 55.0 | 32.62 |
| P200 | 100.0 | 2.51 |
| Trisamino | 35 | 3.08 |
| O1640 | 50 | 4.13 |
| F111 | 100 | 0.16 |
| RM1020 | 25 | 0.62 |
| ASE75 | 40 | 1.18 |

The adhesive composition was tested for 180° peel strength at room temperature according to the test method described above wherein the dry time at 194° F. (90° C.) was 30 minutes, and the test sample room temperature open time ranged from 30 minutes to 72 hours. The open times and substrates used and the peel strengths obtained are presented in Table 2.

TABLE 2

| Open Time, | 180° Peel Strength, piw (kN/m) | |
|---|---|---|
| Hours | Twill to CRS | Twill to Gal. Steel |
| 0.5 | 26.2(4.61) | 20.5(3.61) |
| 1 | 24.5(4.31) | 22.08(3.89) |
| 2 | 23.8(4.19) | 17.6(3.10) |
| 4 | 26.4(4.65) | 19.69(3.47) |
| 6 | 20.9(3.68) | 19.69(3.47) |
| 22 | 21.97(3.87) | 18.22(3.21) |

Examples 2–8 and Comparative Example C-1

These examples demonstrate the effect of incorporating incremental amounts of carboxylated polychloroprene (Aquastik 1120) into the compositions of the invention.

Seven adhesive compositions were prepared by combining in order as above for Example 1 the components described in Table 3 below. In addition to the components listed in Table 3, each composition contained 3.70 phr A310S (55% solid content), 3.08 phr P200 (100% solid content), 3.08 phr Trisamino (35% solid content), 3.08 phr O1640 (50% solid content) and 0.16 phr F111 (100% solid content). Comparative Example 1 was Fastbond™ 30-NF Contact Adhesive, Neutral, a 50% solids, water dispersed contact adhesive, commercially from Minnesota Mining and Manufacturing Company, St. Paul, Minn.

TABLE 3

| Component | Percent Solid Content (%) | Phr Based On 100 Parts By Weight DDS3507 | | | | | | |
|---|---|---|---|---|---|---|---|---|
| | | Ex. 2 | Ex. 3 | Ex. 4 | Ex. 5 | Ex. 6 | Ex. 7 | Ex. 8 |
| DDS3507 | 45.0 | 100 | 100 | 100 | 100 | 100 | 100 | — |
| US53 | 40.0 | — | — | — | — | — | — | 100 |
| AQS1120 | 48.1 | 70.0 | 60.0 | 50.0 | 40.0 | 30.0 | — | — |
| HRJ13130 | 43.3 | 6.66 | 6.66 | 6.66 | 6.66 | 6.66 | 6.66 | 8.00 |
| T5001 | 55.0 | 34.06 | 34.06 | 34.06 | 34.06 | 34.06 | 33.06 | 33.06 |
| RM1020 | 25 | 0.62 | 0.62 | 0.62 | 0.62 | 0.62 | 0.76 | 0.76 |
| ASE75 | 40 | 1.06 | 1.06 | 1.06 | 1.06 | 1.06 | 0.98 | 0.98 |

The adhesive compositions were tested for 180° peel strength at room temperature according to the test method described above wherein the dry time at 194° F. (90° C.) was 20 minutes, the open time was 1 hour, and the test sample room temperature condition time was 48 hours. The substrates used and the peel strengths obtained are presented in Table 4.

TABLE 4

| Ex. No. | 180° Peel Strength, piw (kN/m) | | |
|---|---|---|---|
| | Twill to CRS | Twill to Gal. Steel | Twill to ABS |
| 2 | 17.13 (3.01) | 13.04 (2.30) | — |
| 3 | 20.59 (3.62) | 18.25 (3.21) | — |
| 4 | 22.35 (3.93) | 14.04 (2.47) | 26.75 (4.71) |
| 5 | 20.80 (3.66) | 18.01 (3.17) | 36.67 (6.45) |
| 6 | 22.47 (3.95) | 22.20 (3.91) | — |
| 7 | 3.80 (0.67) | 4.90 (0.86) | 4.00 (0.70) |
| 8 | 5.77 (1.02) | 10.73 (1.89) | — |
| C-1 | 1.83 (0.32) | 1.73 (0.30) | 6.18 (1.09) |

Examples 9–14

These examples coupled with Example 1 illustrate the utility of various thermoplastic resins in the adhesive compositions of the invention.

Six adhesive compositions were prepared by combining in order as in Example 1, the components outlined in Table 5. In addition to the components listed in Table 5, each composition contained 100 parts DDS3507 (45% solid content), 3.7 phr A310S (55% solid content), 3.08 phr Trisamino (35% solid content), 3.08 phr O1640 (50% solid content), 6 phr F111 (100% solid content), and 0.62 phr RM 1020 (25% solid content).

TABLE 5

| Component | Percent Solid Content (%) | Ex. 9 | Ex. 10 | Ex. 11 | Ex. 12 | Ex. 13 | Ex. 14 |
|---|---|---|---|---|---|---|---|
| | | Phr based on 100 parts by wt. DDS3507 | | | | | |
| AQS1120 | 48.1 | 60 | 60 | 60 | 60 | 55 | 59.2 |
| HRJ13130 | 43.3 | 6.66 | 6.66 | 6.66 | 6.66 | 8 | 6.66 |
| T5001 | 55.0 | — | — | — | — | — | — |
| LC55WK | 55.0 | 34.06 | — | — | — | — | 34.06 |
| T1065 | 55.0 | — | 34.06 | — | — | — | — |
| T1085 | 55.0 | — | — | 34.06 | — | — | — |
| AQ6085 | 60.0 | — | — | — | 34.06 | — | — |
| A7129 | 47.0 | — | — | — | — | 33.06 | — |
| P200 | 100.0 | 3.08 | 3.08 | 3.08 | 3.08 | 3.08 | 2.7 |
| ASE75 | 40 | 1.06 | 1.06 | 1.06 | 1.06 | 1.06 | 1.15 |

Examples 1 and 9–14 were tested for 180° peel strength at room temperature according to the test method described above wherein the dry time at 194° F. (90° C.) was 20 minutes, the open time was 1 hour, and the test sample room temperature condition time was 48 hours. The substrates used and the peel strengths obtained are presented in Table 6.

TABLE 6

| Ex. No. | 180° Peel Strength, piw (kN/m) | | |
|---|---|---|---|
| | Twill to CRS | Twill to Gal. Steel | Twill to ABS |
| 1 | 21.96 (3.86) | 23.94 (4.21) | 22.79 (4.01) |
| 9 | 20.6 (3.63) | 15.05 (2.65) | — |
| 10 | 17.83 (3.14) | 18.15 (3.19) | — |
| 11 | 18.93 (3.33) | 20.84 (3.67) | 47.6 (8.38) |
| 12 | 20.25 (3.56) | 13.22 (2.33) | — |
| 13 | 5.19 (0.91) | 3.95 (0.70) | — |
| 14 | 16.87 (2.97) | 13.57 (2.39) | 39.8 (7.00) |

Example 15

This example coupled with Examples 3, 7, and 8 illustrate the utility of various high modulus crystallizing polyurethanes in the adhesive compositions of the invention.

Example 15 was prepared by combining in order, as in Example 1, the components outlined in Table 7 below.

TABLE 7

| Component | Percent Solid Content (%) | Phr Based On 100 Parts By Weight U53 |
|---|---|---|
| US53 | 40.0 | 100 |
| AQS1120 | 48.1 | 60.0 |
| A310 | 55.0 | 3.70 |
| HRJ13130 | 43.3 | 8 |
| T5001 | 55.0 | 33.06 |
| P200 | 100.0 | 3.08 |
| Trisamino | 35 | 3.08 |
| 01640 | 50 | 3.08 |
| F111 | 100 | 0.16 |
| RM1020 | 25 | 0.76 |
| ASE75 | 40 | 0.98 |

Examples 3, 7, 8, and 15 were tested for 180° peel strength at room temperature according to the test method described above wherein the dry time at 194° F. (90° C.) was 20 minutes, the open time was 1 hour, and the test sample room temperature condition time was 48 hours. In addition, the adhesive compositions were tested for 180° peel strength after elevated temperature aging according to the test method described above. The substrates used and the peel strengths obtained are presented in Table 8.

TABLE 8

| | 180° Peel Strength, piw (kN/m) | | | | |
|---|---|---|---|---|---|
| | Twill to CRS | | Twill to Gal. Steel | | Twill to ABS |
| Ex. No. | RT | 127° C. Aged | RT | 127° C. Aged | RT |
| 3 | 20.59(3.62) | 24.76(4.36) | 18.25(3.21) | 21.02(3.70) | 22.79 (4.01) |
| 7 | 3.79(0.67) | 7.50(1.32) | 4.87(0.86) | 15.80(2.78) | 4.02 (0.71) |
| 8 | 5.77(1.02) | 7.8(1.37) | 10.73(1.89) | 14.16(2.49) | — |
| 15 | 19.62(3.45) | 24.78(4.36) | 12.27(2.16) | 16.22(2.85) | 41.4 (7.29) |

Examples 16–18 and Comparative Examples C-2–C-3

These examples coupled with Examples 1, 13, 14, and 15 illustrate the utility of various composition changes including thermoplastic resin, blends of thermoplastic resin, and high modulus crystallizing polyurethanes in the adhesive compositions of the invention.

Three adhesive compositions (Examples 16, 17, and 18) were prepared by combining in order as in Example 1, the components outlined in Table 9 below. In addition to the components listed in Table 9, each composition contained 100 parts DDS3507 (provided at 45% solids content). Comparative Example C-2 was PPG Trim-Bond™ 7877 thermally activated adhesive, a 43% solids, water dispersed adhesive, commercially from PPG Adhesives and Sealants, Adrian, MI. Comparative Example C-3 was Aqualock™ 5806 thermally activated adhesive, a 38% solids, water dispersed contact adhesive, commercially from Sovereign Engineered Adhesives, Akron, Ohio.

TABLE 9

| Component | Percent Solid Content (%) | Phr Based On 100 Parts By Weight DDS3507 | | |
|---|---|---|---|---|
| | | Ex. 16 | Ex. 17 | Ex. 18 |
| AQS1120 | 48.1 | 55.0 | 55.0 | 47.9 |
| A310 | 55.0 | 3.70 | 3.70 | 3.42 |
| HRJ13130 | 43.3 | 8.00 | 8.00 | 6.15 |
| T5001 | 55.0 | 33.06 | — | 23.00 |
| LC55WK | 55.0 | — | 33.06 | — |
| A7129 | 47.0 | — | — | 7.85 |
| P200 | 100.0 | 3.08 | 3.08 | 2.48 |
| Trisamino | 35 | 3.08 | 3.08 | 2.84 |
| 01640 | 50 | 3.08 | 3.08 | 2.84 |
| F111 | 100 | 0.16 | 0.16 | 0.15 |
| RM1020 | 25 | 0.76 | 0.76 | 0.57 |
| ASE75 | 40 | 0.98 | 0.98 | 1.06 |

Examples 1, 13–18, and Comparative Examples C-1, C-2, and C-3 were tested for 180° peel strength at room temperature according to the test method described above wherein the dry time at 176° F. (80° C.) was 20 minutes, the open time was 1 hour, and the test sample room temperature condition time was 7 days. In addition, the adhesive compositions were tested for 180° peel strength after elevated temperature aging, T-Peel Strength at room temperature, and overlap shear strength according to the test methods described above. The substrates and test results are presented in Tables 10 and 11.

TABLE 10

| Test | Substrates | Test Results | | | | |
|---|---|---|---|---|---|---|
| | | Ex. 1 | Ex. 13 | Ex. 16 | Ex. 17 | Ex. 18 |
| 180° Peel Strength At Room Temperature, piw (kN/m) | Twill to CRS | 21.96 (3.86) | 5.19 (0.91) | 12.40 (2.18) | 9.40 (1.65) | 20.37 (3.59) |
| | Twill to Gal. Steel | 23.94 (4.21) | 2.95 (0.70) | 9.91 (1.74) | 7.67 (1.35) | 15.71 (2.76) |
| | Twill to ABS | 22.79 (4.01) | — | — | — | — |
| 180° Peel Strength After Elevated Temperature Aging, piw (kN/m) | Twill to CRS | — | 10.1 (1.78) | 22.3 (3.92) | 16.1 (2.83) | 27.5 (4.84) |
| | Twill to Gal. Steel | — | 9.08 (1.60) | 25.10 (4.42) | 13.78 (2.443) | 26.07 (4.59) |
| T-Peel Strength At Room Temperature, piw (kN/m) | Twill to Twill | — | 14.63 (2.57) | 11.46 (2.02) | 11.25 (1.98) | 21.75 (3.83) |
| Overlap Shear Strength, psi (MPA) | Oak to Oak | 245 (1.69) | — | 159 (1.10) | — | 105 (0.72) |
| | ABS to ABS | 380 (2.62) | — | 318 (2.19) | — | 400 (2.76) |
| | CRS to CRS | 125 (0.86) | — | 188 (1.30) | — | 261 (1.80) |
| | Gal. Steel to Gal. Steel | 233 (1.60) | — | 224 (1.54) | — | 280 (1.93) |

TABLE 11

| Test | Substrates | Test Results | | | | |
|---|---|---|---|---|---|---|
| | | Ex. 14 | Ex. 15 | Ex. C-1 | Ex. C-2 | Ex. C-3 |
| 180° Peel Strength At Room Temperature, piw (kN/m) | Twill to CRS | 16.87 (2.97) | 19.62 (3.45) | 1.83 (0.32) | 5.05 (0.89) | 12.06 (2.12) |
| | Twill to Gal. Steel | 13.57 (2.39) | 12.27 (2.16) | 1.73 (0.30) | 4.65 (0.82) | 14.8 (2.60) |
| | Twill to ABS | 39.8 (7.00) | 41.4 (7.29) | 6.18 (1.09) | — | — |
| 180° Peel Strength After Elevated Temperature Aging, piw (kN/m) | Twill to CRS | 32.60 (5.74) | 24.78 (4.36) | 1.47 (0.26) | 8.92 (1.44) | 10.51 (1.85) |
| | Twill to Gal. Steel | 24.4 (4.29) | 16.22 (2.85) | 1.84 (0.32) | 4.67 (0.82) | 13.41 (2.36) |
| T-Peel Strength At Room Temperature, piw (kN/m) | Twill to Twill | 22.49 (3.96) | 13.04 (2.30) | 10.2 (1.80) | 0.85 (0.15) | No bond |
| Overlap Shear Strength, psi (MPa) | Oak to Oak | 150 (1.03) | 200 (1.38) | 17.4 (0.12) | No bond | No bond |
| | ABS to ABS | 351 (2.42) | 412 (2.84) | 33 (0.23) | 49.5 (0.34) | No bond |
| | CRS to CRS | 294 (2.02) | 150 (1.03) | 17 (0.12) | 25.6 (0.18) | No bond |
| | Gal. Steel to Gal. Steel | 227 (1.56) | 234 (1.61) | 24 (0.16) | No bond | No bond |

Examples 19–26

Examples 19–26 illustrate the utility of enhancing the thermal resistance through the addition of various crosslinkers and thermosetting resins.

Seven adhesive compositions were prepared by combining in order as in Example 1, the components outlined in Table 2. In addition to the components listed in Table 12, each composition contained 100 parts DDS3507 (45% solid content), 3.7 phr A310S, 3.08 phr P200, 3.08 phr O1640, 3.08 phr Trisamino, 0.62 phr RM1020 and 1.06 phr ASE75, and 0.16 phr F111.

TABLE 12

| Component | Percent Solid Content (%) | Phr based on 100 parts by wt. DDS3507 | | | | | | | |
|---|---|---|---|---|---|---|---|---|---|
| | | Ex. 19 | Ex. 20 | Ex. 21 | Ex. 22 | Ex. 23 | Ex. 24 | Ex. 25 | Ex. 26 |
| AQS1120 | 48.1 | 60 | 60 | 60 | 60 | 55 | 59.2 | 60 | 60 |
| HRJ13130 | 43.3 | — | — | — | — | — | — | — | 6.66 |
| T5001 | 55.0 | 34.06 | 34.06 | 34.06 | — | 24.06 | 34.06 | — | 34.06 |
| W78 | 100 | — | 1.5 | — | — | — | — | — | — |
| NH4Cl | 35 | — | — | — | — | — | — | 0.5 | — |
| BI7986 | 40.0 | — | — | — | 7.5 | — | — | — | — |
| AL3029C | 65 | — | — | — | — | — | 10 | — | — |
| MgO | 30 | 0.75 | — | — | — | — | — | — | — |
| AL8405C | 61 | — | — | — | — | 34.06 | — | 34.06 | — |
| A6010 | 100 | — | — | — | — | — | 3.0 | — | — |

Examples 19–26 were tested according to the test methods "Room Temperature 180° Peel Strength, Substrate to Twill", and "Elevated Temperature Aged 180° Peel Strength, Substrate to Twill" wherein the dry time at 194° F. (90° C.) was 20 minutes, the open time was 1 hour, and the test sample room temperature condition time was 72 hours. In addition, the adhesive compositions were tested for Heat Resistance. The substrates and test results are presented in Table 13.

TABLE 13

| | 180° Peel Strength, piw (kN/m) | | Heat Resistance Bond Separation, Inches (mm) | | | | | |
|---|---|---|---|---|---|---|---|---|
| Ex. No. | RT Twill to CRS | Elevated Temperature Twill to CRS | @ 60° C. | @ 70° C. | @ 80° C. | @ 90° C. | @ 100° C. | @ 120° C. |
| 19 | 13.72 (2.41) | 26.62 (4.68) | 0 (0) | 0.2 (5) | 0.9 (22) | 1.5 (38) | 2.7 (70) | — |
| 20 | 22.67 (3.98) | 31.91 (5.61) | 0 (0) | 0.35 (9) | 1.7 (44) | 3.1 (80) | 6.3 (160) | — |
| 21 | 21.48 (3.77) | 41.03 (7.21) | 0 (0) | 1.0 (26) | 2.8 (71) | 6.4 (164) | — | — |
| 22 | 7.34 (1.29) | 16.33 (2.87) | 0.55 (14) | 0.55 (14) | 0.63 (16) | 0.63 (16) | 0.63 (16) | 0.63 (16) |
| 23 | 16.24 (2.85) | 23.25 (4.09) | 0.04 (1) | 0.4 (10) | 1.3 (32) | 2.5 (64) | 4.5 (115) | — |
| 24 | 18.25 (3.21) | 33.69 (5.92) | 0.3 (8) | 1.5 (37) | 2.9 (74) | 5.3 (135) | 6.3 (160) | — |
| 25 | 24.98 (4.39) | 30.79 (5.41) | 0 (0) | 0 (0) | 0 (0) | 0 (0) | 0 (0) | 0 (0) |
| 26 | 18.25 (3.21) | — | 0.12 (3) | 0.6 (15) | 2.4 (60) | 5.4 (138) | 6.3 (160) | — |

Examples 27–39

These examples coupled with Examples 1, 18, and C-1 to C-3 illustrate recovery of storage modulus (G') after heating films of the adhesive compositions of the invention.

Thirteen adhesive compositions (Examples 27–39) were prepared by combining in order as in Example 1, the components outlined in Tables 14 and 15 below. In addition to the components listed in Tables 14 and 15, each composition contained 100 parts DDS3507 (provided at 45% solids content), 3.08 phr Trisamino (35% solid content), 3.08 phr O1640 (50% solid content), 0.16 phr F111 (100% solid content), and 0.62 phr RM 1020 (25% solid content).

TABLE 14

| Component | Percent Solid Content (%) | Phr Based On 100 Parts By Weight DDS3507 | | | | | |
|---|---|---|---|---|---|---|---|
| | | Ex. 27 | Ex. 28 | Ex. 29 | Ex. 30 | Ex. 31 | Ex. 32 |
| AQS1120 | 48.1 | 59.2 | 59.2 | 59.2 | 59.2 | 59.2 | 59.2 |
| A310 | 55.0 | 3.7 | 3.7 | 3.7 | 3.7 | 11.1 | 3.7 |
| HRJ13130 | 43.3 | 6.66 | 6.66 | 6.66 | 6.66 | 5.45 | 6.66 |
| T5001 | 55.0 | 34.06 | 34.06 | 34.06 | 24.91 | 27.87 | 34.06 |
| A7129 | 47.0 | — | — | — | 8.88 | — | — |
| P200 | 100.0 | 2.69 | 2.69 | 2.69 | 2.69 | 2.69 | 2.69 |
| MgO | 50 | 0.74 | 2.96 | — | — | — | 1.48 |
| ASE75 | 40 | 1.15 | 1.15 | 1.15 | 1.15 | 1.15 | 1.15 |

TABLE 15

| Component | Percent Solid Content (%) | Phr Based On 100 Parts By Weight DDS3507 | | | | | | |
|---|---|---|---|---|---|---|---|---|
| | | Ex. 33 | Ex. 34 | Ex. 35 | Ex. 36 | Ex. 37 | Ex. 38 | Ex. 39 |
| AQS1120 | 48.1 | 59.2 | 59.2 | 59.2 | 59.2 | 60 | 60 | 60 |
| A310 | 55.0 | 3.7 | 3.7 | 3.7 | 3.7 | 3.7 | 3.7 | 3.7 |
| HRJ13130 | 43.3 | — | 6.66 | 6.66 | — | 34.06 | — | — |
| T5001 | 55.0 | — | 34.06 | 34.06 | — | — | — | 34.06 |
| A7129 | 47.0 | 40.72 | — | — | 40.72 | — | — | — |
| AL3029C | 45.0 | — | — | — | — | — | 34.06 | — |
| Co1770 | 100.0 | — | — | 0.92 | — | — | — | — |
| W78 | 100.0 | — | — | — | — | 1.0 | — | — |
| ADH | 100.0 | — | — | — | — | 3.0 | — | — |
| P200 | 100.0 | 2.69 | 2.69 | 2.69 | 2.69 | 3.08 | 3.08 | 3.08 |
| MgO | 50 | — | — | — | — | — | — | 3.00 |
| ASE75 | 40 | 1.15 | 1.15 | 1.15 | 1.15 | 1.06 | 1.06 | 1.06 |

Examples 1, 3, 5, 18, and 27–39, Comparative Examples C-1, C-2, C-3, and Polymers Dispercoll U53 and Luphen DDS 3507 were tested for storage modulus (G') according to the test method described above. The test results are presented in Table 16.

TABLE 16

| Ex. No. | Temperature, °C. | % Increase in G' Time, Minutes | | | | |
|---|---|---|---|---|---|---|
| | | 2 | 5 | 10 | 20 | 30 |
| 1 | 80 | 75 | 199 | 337 | 402 | 427 |
| 3 | 80 | 71 | 217 | 486 | 904 | 1221 |
| 5 | 80 | 39 | 112 | 254 | 583 | 811 |
| 18 | 80 | 21 | 72 | 202 | 577 | 861 |
|  | 50 | 45 | 146 | 480 | 872 | 991 |
| 27 | 80 | — | 40 | 117 | 291 | 475 |
|  | 50 | 54 | 163 | 352 | 696 | 889 |
| 28 | 80 | — | 33 | 74 | 195 | 347 |
|  | 50 | 32 | 90 | 180 | 338 | 538 |
| 29 | 80 | — | 48 | 141 | 369 | 529 |
|  | 50 | 26 | 73 | 166 | 393 | 591 |
| 30 | 80 | 37 | 123 | 369 | 310 | 313 |
| 31 | 80 | 25 | 79 | 529 | 304 | 378 |
| 32 | 80 | 60 | 155 | 269 | 457 | 513 |
| 33 | 80 | 30 | 86 | 199 | 375 | 442 |
| 34 | 80 | 38 | 105 | 199 | 342 | 440 |
| 35 | 80 | 46 | 172 | 426 | 564 | 594 |
| 36 | 80 | 29 | 75 | 169 | 378 | 523 |
| 37 | 80 | 76 | 263 | 627 | 1193 | 1450 |
| 38 | 80 | 28 | 58 | 79 | 73 | 73 |
| 39 | 80 | 35 | 88 | 179 | 334 | 438 |
| C-1 | 80 | 3 | 6 | 9 | 13 | 15 |
| C-2 | 80 | 8 | 12 | 17 | 21 | 23 |
| C-3 | 80 | 10 | 17 | 23 | 30 | 35 |
| U53 | 80 | 70 | 175 | 608 | 5262 | — |
| DDS3507 | 80 | 229 | 439 | 589 | 588 | 601 |

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein.

What is claimed:

1. A water-dispersed adhesive composition comprising:
   a high modulus crystallizing polyester polyurethane;
   a polychloroprene;
   acrylic ester copolymer;
   a resin selected from the group consisting of thermosetting resins, thermoplastic resins, and a combinations thereof; and
   a stabilizer system selected from the group consisting of branched primary amino alcohols; a combination of branched primary amino alcohol and carbodiimide; a combination of carbodiimide and dihydroxy metal compound; a combination of branched primary amino alcohol and dihydroxy metal compound; and a combination of branched primary amino alcohol, carbodiimide, and magnesium oxide.

2. The water-dispersed adhesive composition of claim 1 wherein the polychloroprene is present in the composition at a level of from about 20 to about 285 parts per 100 parts high modulus crystallizing polyester polyurethane on a dry weight basis.

3. The water-dispersed adhesive composition of claim 1 wherein the acrylic ester copolymer is present in the composition at a level of from about 1 to about 200 parts acrylic ester copolymer per 100 parts high modulus crystallizing polyester polyurethane on a dry weight basis.

4. The water-dispersed adhesive composition of claim 1 wherein the high modulus crystallizing polyester polyurethane is a high modulus crystallizing sulfonated polyester polyurethane.

5. The water-dispersed adhesive composition of claim 1 further comprising a rheology modifier.

6. The water-dispersed adhesive composition of claim 5 wherein the rheology modifier is present in an amount of from about 0.3 to about 3.2 parts per 100 parts high modulus crystallizing polyester polyurethane on a dry weight basis.

7. The water-dispersed adhesive composition of claim 5 wherein the rheology modifier is a hydrophobically-modified associative polyurethane.

8. The water-dispersed adhesive composition of claim 1 wherein the resin is a combination of thermoplastic resin and thermosetting resin.

9. The water-dispersed adhesive composition of claim 8 wherein the thermosetting resin is present in an amount of from about 2 to about 15 parts per 100 parts high modulus crystallizing polyester polyurethane on a dry weight basis and the thermoplastic resin is present in an amount of from about 10 to about 40 parts per 100 parts high modulus crystallizing polyester polyurethane on a dry weight basis.

10. The water-dispersed adhesive composition of claim 8 wherein the thermoplastic resin comprises rosin esters, acrylic resins, or pure monomer hydrocarbon resins and the thermosetting resin comprises phenolic resins based on butylphenol, phenol and cresol, butylphenol and bisphenol A, amylphenol and bisphenol A, bisphenol A, octylphenol, phenol, or combinations thereof.

11. The water-dispersed adhesive composition of claim 1 wherein the branched primary amino alcohols are selected from the group consisting of 2-amino-1-butanol; 2-amino-2-methyl-1,3-propanediol; 2-amino-2-methyl-1-propanol; 2-amino-2-ethyl-1,3-propanediol; tris(hydroxymethyl) aminomethane; and combinations thereof.

12. The water-dispersed adhesive composition of claim 1 wherein the carbodiimide is selected from the group consisting of water dispersions of the reaction product of tetramethylxylene diisocyanate; (poly(nitrilomethanetetraylnitrilo (2,4,6-tris(1-methylethyl)-1,3-phenylene)); tetraisopropyldiphenylcarbodiimide; and combinations thereof.

13. The water-dispersed adhesive composition of claim 1 wherein the dihydroxy metal compound is selected from the group consisting of dihydroxyaluminum aminoacetate; dihydroxyaluminum sodium carbonate; and combinations thereof.

14. The water-dispersed adhesive composition of claim 1 further comprising an antioxidant.

15. The water-dispersed adhesive composition of claim 14 wherein the stabilizer system is a combination of branched primary amino alcohol and carbodiimide.

16. The water-dispersed adhesive composition of claim 15 wherein the branched primary amino alcohol is present in an amount of from about 0.5 to about 5 parts per 100 parts high modulus crystallizing polyester polyurethane on a dry weight basis and the carbodiimide is present in an amount of from about 0.5 to about 5 parts per 100 parts high modulus crystallizing polyester polyurethane on a dry weight basis.

17. The water-dispersed adhesive composition of claim 16 wherein the branched primary amino alcohol is tris(hydroxymethyl)aminomethane and the carbodiimide is a reaction product of tetramethylxylene diisocyanate.

18. The water-dispersed adhesive composition of claim 17 wherein the polychloroprene is present in an amount of from about 20 to about 285 parts per 100 parts high modulus crystallizing polyester polyurethane on a dry weight basis; the acrylic ester copolymer is a copolymer of butyl acrylate and methyl methacrylate crosslinked with a dihydrazide and is present in an amount of from about 1 to about 200 parts per 100 parts high modulus crystallizing polyester polyurethane on a dry weight basis; the resin is a combination of thermoplastic resin and thermosetting resin wherein the thermoplastic resin comprises rosin esters, acrylic resins, or pure monomer hydrocarbon resins and the thermosetting resin comprises phenolic resins based on butylphenol, phenol and cresol, butylphenol and bisphenol A, amylphenol and bisphenol A, bisphenol A, octylphenol, phenol or combinations thereof, and wherein the composition further comprises from about 0.3 to about 3.2 parts of hydrophobically-modified associative polyurethane per 100 parts high modulus crystallizing polyester polyurethane on a dry weight basis.

19. A method of bonding a substrate comprising the steps of:
   applying the adhesive composition of claim 1 to a substrate; and
   removing water from the adhesive composition.

* * * * *

UNITED STATES PATENT AND TRADEMARK OFFICE
CERTIFICATE OF CORRECTION

PATENT NO. : 6,310,125 B1  
DATED : October 30, 2001  
INVENTOR(S) : Rayner, Terry J.

Page 1 of 1

It is certified that error appears in the above-identified patent and that said Letters Patent is hereby corrected as shown below:

Title page,
Item [56], References Cited, FOREIGN PATENT DOCUMENTS, insert the following reference:
-- 0 936 249 A1   8/1999  (EP) --.

Column 7,
Line 43, delete "351 0-WO-60" and insert in place thereof -- 3510-WO-60 --.

Column 9,
Line 20, delete "$1 \times 9^8$" and insert in place thereof -- $1 \times 10^9$ --.
Line 34, delete "carbodimnide" and insert in place thereof -- carbodiimide --.
Line 47, delete "LCS5WK" and insert thereof -- LC55WK --.
Line 50, delete "Butylacrylatelacrylonitrile" and insert in place thereof
-- Butylacrylate/acrylonitrile --.

Column 14,
Line 66, delete "6 phr" and insert in place thereof -- 0.16 phr --.

Column 16,
Table 8, Title line, delete "1800 Peel Strength" and insert in place thereof
-- 180° Peel Strength --.

Column 17,
Table 10, under Ex. 13, delete "2.95" and insert in place thereof -- 3.95 --

Column 18,
Line 41, delete "Table 2" and insert in place thereof -- Table 12 --.

Signed and Sealed this

Twenty-fifth Day of May, 2004

JON W. DUDAS  
*Acting Director of the United States Patent and Trademark Office*